United States Patent Office 3,814,749
Patented June 4, 1974

3,814,749
BLUE PHENYLAZONAPHTHYLAZO-N-ARYL PERI ACIDS
James F. Feeman, Wyomissing, Pa., assignor to Crompton & Knowles Corporation, New York, N.Y.
No Drawing. Continuation-in-part of abandoned application Ser. No. 816,095, Apr. 14, 1969. This application Dec. 22, 1971, Ser. No. 211,097
Int. Cl. C09b 31/04; D06p 3/24
U.S. Cl. 260—190         5 Claims

ABSTRACT OF THE DISCLOSURE

New compounds having the structure

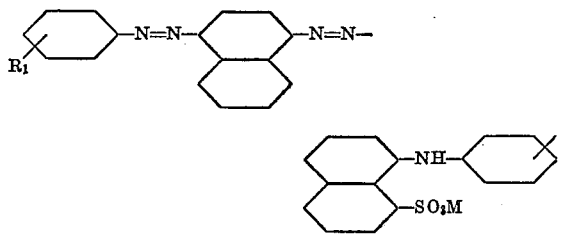

wherein M is —H, —Na, —K or —$NH_4$; $R_1$ is —H, —$CH_3$, or —Cl and $R_2$ is —H, —$CH_3$ or —$OCH_3$ are useful as blue dyes for natural and synthetic polyamides and for spandex fibers.

---

This application is a continuation-in-part of my application Ser. No. 816,095, filed Apr. 14, 1969, and now abandoned.

This invention relates to novel organic compounds that are useful as dyes for natural and synthetic polyamide fibers and for synthetic polyurethane fibers known generically as spandex fibers.

The new compounds have the structure:

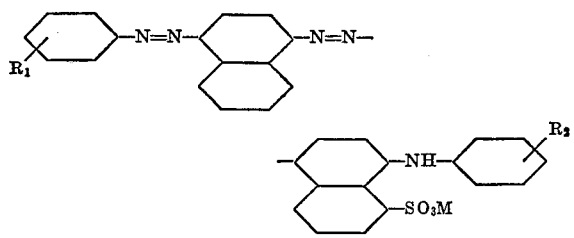

wherein M represents —H, —Na, —K, or —$NH_4$, $R_1$ represents —H, —$CH_3$, —$OCH_3$ or —Cl, and $R_2$ represents —H, —$CH_3$ or —$OCH_3$.

These compounds are obtained by diazotizing aniline, a toluidine, an anisidine, or a chloroaniline, coupling the diazonium salt with 1-naphthylamine, rediazotizing the aminomonoazo intermediate product and coupling with an N-aryl peri acid, such as, N-phenyl, N-o-tolyl, N-m-tolyl, N-p-tolyl, N-o-anisyl, N-m-anisyl or N-p-anisyl peri acid.

The new compounds have unique and highly valuable properties when used as dyes. The dye polyamide and polyurethane fibers such as wool, silk, nylon, Lycra (a product of E. I. du Pont de Nemours and Co., Inc.) Vyrene (a product of Uniroyal, Inc.), and Spandex fibers (produced by other companies under various trade names) in light-fast navy-blue shades having good wet-fastness. The resultant dyeings are characterized by excellent levelness and freedom from warp streaks.

Commercial dyes presently available such as C.I. Acid Blue 113 which has the formula

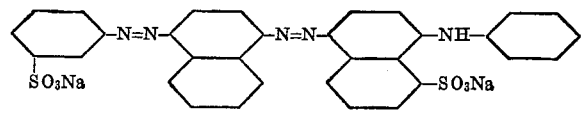

do not cover imperfection in woven and knit nylon fabrics well, but tend to accentuate them. They also do not dye the synthetic spandex fibers well and do not exhaust from neutral to alkaline dyebaths to the extent that is frequently desired.

The dyes of the present invention overcome the objections to dyes of the prior art mentioned above, and also have surprisingly good solubility in water, despite their relatively high molecular weight and the presence of only one solubilizing (sulfonic acid) group in the molecule. This property makes these dyes useful in the dyeing equipment currently available in the trade.

The following examples will serve to illustrate how the compounds of this invention may be prepared and used. In the examples, unless otherwise indicated, parts are by weight, temperatures are in degrees centigrade and percentages are by weight.

EXAMPLE 1

Aniline (9.3 parts) was dissolved in 100 parts of water by means of 28 parts of concentrated hydrochloric acid. Ice was added to lower the temperature to 0° and a solution of 7 parts of sodium nitrite in 20 parts of water was added. A solution of 14.3 parts of 1-naphthyl-amine in 300 parts of water and 15 parts of concentrated hydrochloric acid at 80° was then run into the diazo solution and cracked ice added simultaneously to keep the temperature at 0°.

A solution of 14 parts of sodium hydroxide in 60 parts of water was added during 30 minutes raising the pH to 3.5, and then to 9.5 during the next 30 minutes. Then a 30% solution in water of 7.7 parts of sodium nitrite was added, followed rapidly by 55 parts of concentrated hydrochloric acid.

The mixture was stirred for four hours at 10–15° with excess nitrous acid present, providing a solution of the diazonium salt. A slight excess of nitrous acid was decomposed by addition of sulfamic acid and a small amount of insoluble matter removed by filtration.

This diazonium salt solution was then run into a solution of 29.9 parts of phenyl peri acid in 400 parts of water (dissolved by the addition of 6 parts of sodium carbonate) and containing 40 parts of sodium acetate and flaked ice to lower the temperature to 0°. The product crystallized out. After stirring overnight the pH of the slurry was raised to about 9 by addition of about 27 parts of sodium hydroxide as 50% solution in water.

The product was filtered and dried. It was a dark colored solid which was soluble in water and dyed nylon, silk, wool and spandex polyurethane fibers from neutral to alkaline baths in level navy shades having excellent fastness to light and good fastness to wet treatments. The wet-fastness was readily made excellent by aftertreatment of the dyed fabrics with any one of a number of materials commonly used in the trade such as tannic acid.

The product has the structure:

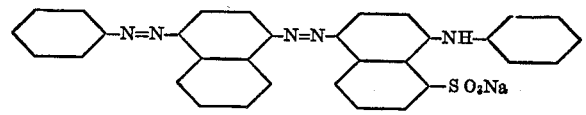

Replacement of the sodium salts used in this example with corresponding potassium salts afforded the potassium salt of the dye which had slightly less water solubility, but otherwise similar properties to the sodium salt.

Treatment of these dyes with excess mineral acid in aqueous slurry followed by filtration and washing the product with acid water gave the free acid form of the dye (M is —H) which was essentially insoluble in water.

Treatment of the free acid form of the dye with ammonia converted it to the corresponding ammonium salt (M is —$NH_4$) which had similar properties to those of the sodium salt. Likewise, treatment of the free acid form of the dye with potassium carbonate gave the corresponding potassium salt (M is —K).

EXAMPLE 2 m-Chloroaniline (12.8 parts) in 50 parts of water and 25 parts of concentrated hydrochloric acid was treated with cracked ice to lower the temperature to 0° and diazotized by addition of 25 parts of 4 N sodium nitrite solution. The diazonium salt solution was then run into an emulsion prepared by dissolving at 80° C. 14.3 parts of 1-naphthylamine in 250 parts of water, 15 parts of concentrated hydrochloric acid and 2 parts of Triton X–100 (a product of the Rohm and Haas Company) and adding cracked ice to lower the temperature to 0° C.

The pH of the mixture was raised to about 3.5 by slow addition of 20 parts of sodium acetate dissolved in 50 parts of water and stirred until coupling was complete.

Then 40 parts of concentrated hydrochloric acid was added followed by about 8 parts of sodium nitrite as 25% aqueous solution at 10° C. After stirring two hours the amino group was substantially all diazotized and the diazonium salt had recrystallized as a yellow solid. This was filtered and added as wet paste to a cold solution of 30 parts of N-phenyl peri acid in 400 parts of water (dissolved by means of 4 parts of sodium hydroxide and buffered with 10 parts of sodium acetate). After stirring one hour the coupling was complete. The pH of the slurry was raised to 11 by addition of 4 parts of sodium hydroxide as solution and the resultant precipitate filtered and dried. It was a dark colored solid which was soluble in water. It dyed nylon, silk, wool and spandex fibers from neutral to alkaline baths in level navy shades, somewhat greener than those produced by the product of Example 1, having very good fastness to light and wet treatments. The product has the structure:

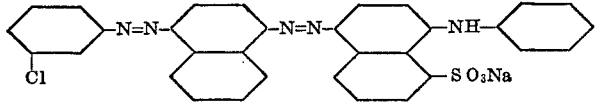

Dyes having similar properties to those of Example 1 were prepared using the intermediates listed in the following Table I by diazotizing the first component listed and coupling to 1-naphthylamine, rediazotizing the monoazo intermediate and coupling to the third component listed.

Where the diazonium salts of the aminomonoazo intermediates prepared in the course of making the dyes listed in Table I crystallized from solution, the diazonium salts were filtered out and pasted for use in the final couplings with the aryl peri acids as described in Example 2.

TABLE I

| Ex. No. | First component | Third component | Shade of dyeing on nylon |
|---|---|---|---|
| 3 | o-Toluidine | N-phenyl peri acid | Reddish-navy. |
| 4 | m-Toluidine | do | Do. |
| 5 | p-Toluidine | do | Do. |
| 6 | o-Anisidine | do | Do. |
| 7 | p-Anisidine | do | Do. |
| 8 | o-Chloroaniline | do | Greenish-navy. |
| 9 | p-Chloroaniline | do | Do. |
| 10 | Aniline | N-p-Tolyl peri acid | Navy. |
| 11 | m-Chloroaniline | do | Greenish-navy. |
| 12 | Aniline | N-m-tolyl peri acid | Navy. |
| 13 | o-Toluidine | do | Reddish-navy. |
| 14 | m-Toluidine | do | Navy. |
| 15 | p-Toluidine | do | Do. |
| 16 | m-Chloroaniline | do | Greenish-navy. |
| 17 | Aniline | N-p-anisyl peri acid | Do. |
| 18 | m-Chloroaniline | do | Do. |
| 19 | m-Toluidine | do | Reddish-navy. |
| 20 | p-Toluidine | do | Greenish-navy. |
| 21 | o-Toluidine | do | Navy. |

I claim:
1. The compound having the structure:

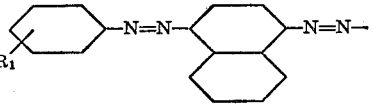
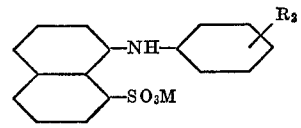

wherein M represents —H, —Na, —K or —$NH_4$, $R_1$ represents —H, —$CH_3$, —$OCH_3$ or —Cl and $R_2$ represents —H, —$CH_3$ or —$OCH_3$.

2. A compound according to claim 1 wherein $R_1$ is —H and $R_2$ is —H.

3. A compound according to claim 1 wherein $R_1$ is —Cl and $R_2$ is —H.

4. A compound according to claim 2 wherein M is —Na.

5. A compound according to claim 3 wherein M is —Na.

References Cited
UNITED STATES PATENTS

| 425,885 | 4/1890 | Kahn | 260—190 |
| 498,405 | 5/1893 | Ott | 260—190 |
| 2,270,454 | 1/1942 | Krebser et al. | 260—190 |
| 3,340,247 | 9/1967 | Riat et al. | 260—153 |

FOREIGN PATENTS

| 118,655 | 4/1892 | Germany | 260—190 |

OTHER REFERENCES

Colour Index, vol. 3, pp. 3210–3211 (1956).

FLOYD D. HIGEL, Primary Examiner

U.S. Cl. X.R.

260—177, 185

UNITED STATES PATENT OFFICE
CERTIFICATE OF CORRECTION

Patent No. 3,814,749                    Dated June 4, 1974

Inventor(s)  James F. Feeman

It is certified that error appears in the above-identified patent and that said Letters Patent are hereby corrected as shown below:

Column 1, the structure appearing in the Abstract between lines 14 and 27 should be modified to include linkage and $R_2$ substituent as shown below in red ink:

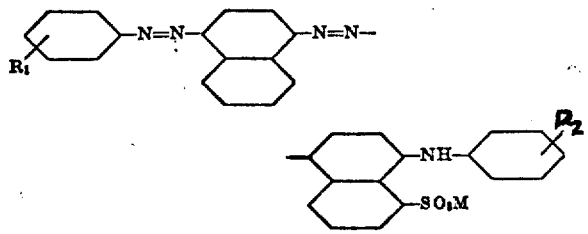

Column 1, line 64, change "The" to --They--

Column 4, the structure in Claim 1 should be modified to include the linkage shown in red ink below:

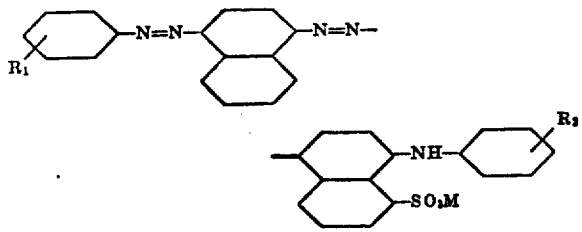

Signed and sealed this 13th day of May 1975.

(SEAL)
Attest:

RUTH C. MASON
Attesting Officer

C. MARSHALL DANN
Commissioner of Patents
and Trademarks